United States Patent
Lee et al.

(10) Patent No.: US 12,399,759 B2
(45) Date of Patent: Aug. 26, 2025

(54) DATA ENHANCEMENTS FOR REMOTE PROCEDURE CALL FRAMEWORKS

(71) Applicant: Wells Fargo Bank, N.A., San Francisco, CA (US)

(72) Inventors: Asheley Shawn Lee, Collegeville, PA (US); Ryan Linn, Raleigh, NC (US); Patrick Kelly O'Donnell, Denver, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 379 days.

(21) Appl. No.: 18/319,929

(22) Filed: May 18, 2023

(65) Prior Publication Data

US 2024/0385914 A1 Nov. 21, 2024

(51) Int. Cl.
| | | |
|---|---|---|
| *G06F 9/54* | | (2006.01) |
| *G06F 9/48* | | (2006.01) |
| *H04L 9/40* | | (2022.01) |

(52) U.S. Cl.
CPC ............ *G06F 9/547* (2013.01); *G06F 9/4881* (2013.01); *H04L 63/1416* (2013.01)

(58) Field of Classification Search
CPC ..... G06F 9/547; G06F 9/4881; H04L 63/1416
See application file for complete search history.

(56) References Cited

U.S. PATENT DOCUMENTS

| | | | |
|---|---|---|---|
| 5,682,534 A * | 10/1997 | Kapoor | H04L 9/40 |
| | | | 719/312 |
| 6,976,053 B1 | 12/2005 | Tripp et al. | |
| 7,613,805 B1 * | 11/2009 | Katzer | G06F 9/505 |
| | | | 709/224 |
| 10,270,788 B2 * | 4/2019 | Faigon | G06N 20/00 |
| 10,417,043 B1 * | 9/2019 | Braverman | G06F 9/4881 |
| 10,419,439 B1 * | 9/2019 | Benskin | H04W 12/08 |
| 11,683,254 B1 * | 6/2023 | Kumar | H04L 67/02 |
| | | | 709/224 |
| 2003/0172294 A1 * | 9/2003 | Judge | H04L 63/0245 |
| | | | 726/13 |
| 2010/0005072 A1 | 1/2010 | Pitts | |
| 2010/0125856 A1 * | 5/2010 | Dash | G06F 9/45545 |
| | | | 719/321 |
| 2015/0074259 A1 | 3/2015 | Ansari et al. | |
| 2015/0278513 A1 * | 10/2015 | Krasin | G06F 21/53 |
| | | | 726/30 |

(Continued)

FOREIGN PATENT DOCUMENTS

| | | |
|---|---|---|
| WO | 9944123 A1 | 9/1999 |
| WO | 2017127850 A1 | 1/2017 |

*Primary Examiner* — John B King
(74) *Attorney, Agent, or Firm* — Merchant & Gould P.C.

(57) ABSTRACT

An application management system using Remote Procedure Call (RPC) frameworks can include enhancements. These enhancements can be used on files that are distributed to engines throughout the RPC framework. Enhancements can be stored in an enhancement server. The enhancements can include password detection, logo detection, cleartext detection, or other checks or modifications that may be useful to a variety of engines in the RPC framework. The enhancements can be used to ensure that unencrypted sensitive data, passwords, or files with confidential information (as indicated by logos or other pictorial markings) are not distributed throughout the RPC framework.

20 Claims, 7 Drawing Sheets

(56) References Cited

U.S. PATENT DOCUMENTS

2018/0041491 A1* 2/2018 Gupta .................... G06F 9/547
2021/0117249 A1* 4/2021 Doshi .................... G06F 9/547
2021/0306429 A1* 9/2021 Jonas .................... H04L 67/562

* cited by examiner

DATA ENHANCEMENTS FOR REMOTE PROCEDURE CALL FRAMEWORKS

BACKGROUND

Remote Procedure Call (RPC) frameworks can be used for building distributed systems in which components or services are located on different machines and communicate with each other over a network. RPC allows clients to call methods or procedures on a remote server as if they were local, abstracting away the network communication details. RPC frameworks provide a standardized way of defining remote services, specifying their interfaces, and generating the necessary code for clients to interact with them.

RPC frameworks are used in a variety of applications, including microservices architectures, cloud computing, and distributed systems. They facilitate scaling of services independently, allowing developers to add or remove services as necessary without affecting the rest of the system. Some popular RPC frameworks include the gRPC framework, Apache Thrift, and Apache Avro.

gRPC in particular has gained traction because it is fast and efficient, especially when used in microservices architectures. gRPC can handle even large sets of data, worklists, and queues, but these large data sets cause correspondingly high demands on gRPC's use of volatile memory.

SUMMARY

According to a first aspect, an application management system includes an enhancements server configured to store a plurality of individual enhancements, a memory and configured to store a plurality of queues corresponding to a plurality of tasks, and a processor communicatively coupled to a plurality of engines, the processor configured to assign the plurality of tasks to the plurality of engines based upon the plurality of queues. The plurality of queues includes instructions to cause the plurality of engines to apply the plurality of individual enhancements stored at the enhancements server.

According to another aspect, a method includes assigning a queue to an engine by a remote procedure call processor, the queue including a plurality of tasks to be performed by the engine. For each task of the plurality of tasks, the method includes identifying one or more enhancement triggers by the engine. The method includes applying an enhancement corresponding to each of the identified one or more enhancement triggers.

According to another aspect, a method includes retrieving, by an engine, a queue of tasks corresponding to a file. The method includes identifying, by a machine learning model at an engine, one or more enhancement triggers corresponding to the file in the queue. The method includes applying an enhancement corresponding to each of the identified one or more enhancement triggers. The method includes using the identification of the one or more enhancement triggers as feedback to the machine learning model.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Remote Procedure Call (RPC) frameworks have grown in popularity as tasks are carried out by remote servers of different types at different locations. With increased data set sizes, the handling of various work queues and allocation of tasks to engines can be handled quickly.

Additionally, because such systems can be scaled up to include any number of engines, additional workflows can be performed, referred to herein as "enhancements." These enhancements can be mutations of data or metadata, or recognition of certain file types or contents of interest. Enhancements can be performed on data as it is processed by each of the engines in an RPC framework in coordination with one or more enhancements servers.

The enhancements described herein can be used to identify items such as insecure passwords, sensitive information types or contents, or images that indicate that a file should be processed differently than other files. Additionally, enhancements can include identification or modification of files or their contents based on file type to cleartext.

Throughout this application, terms are used that have specific meanings within the context of computer-implemented technologies. For clarity, several such terms that are used in the application have specific meanings as set out below.

First, the term "engine" as used throughout this application refers to a generic work handler. In an RPC system, engines can be either general purpose or special purpose computers or servers. For example, in some RPC systems an engine may be suited for a type of task, either due to its geographical location, its design and capabilities, or some other criterion. Tasks may be assigned to specific engines that are particularly suitable or required for those tasks. Such tasks and their associated engines are referred to as being pinned. Other tasks may be suitable for completion by any engine that is available. Unless otherwise specified, the enhancements described herein can be performed by any engine, regardless of whether that engine is a general-purpose engine or a pinned engine.

Priority queues (sometimes referred to throughout this application merely as "queues") are data structures that hold requests from clients waiting to be processed. When a client sends a request to the server, the request is added to the queue. Conventionally, the server then processes requests from the queue one by one in the order they were received, typically using a first-in-first-out approach. In a priority queuing system, items are ordered by priority and if multiple requests have the same priority then they are performed in the order received grouped by the highest priority. RPC frameworks using queues facilitate handling of requests from multiple clients concurrently, even if the requests arrive at the same time, preventing resource contention and improving system stability by allowing the server to manage its workload efficiently. A queue can identify a server that has files that should be processed.

Figure 1:
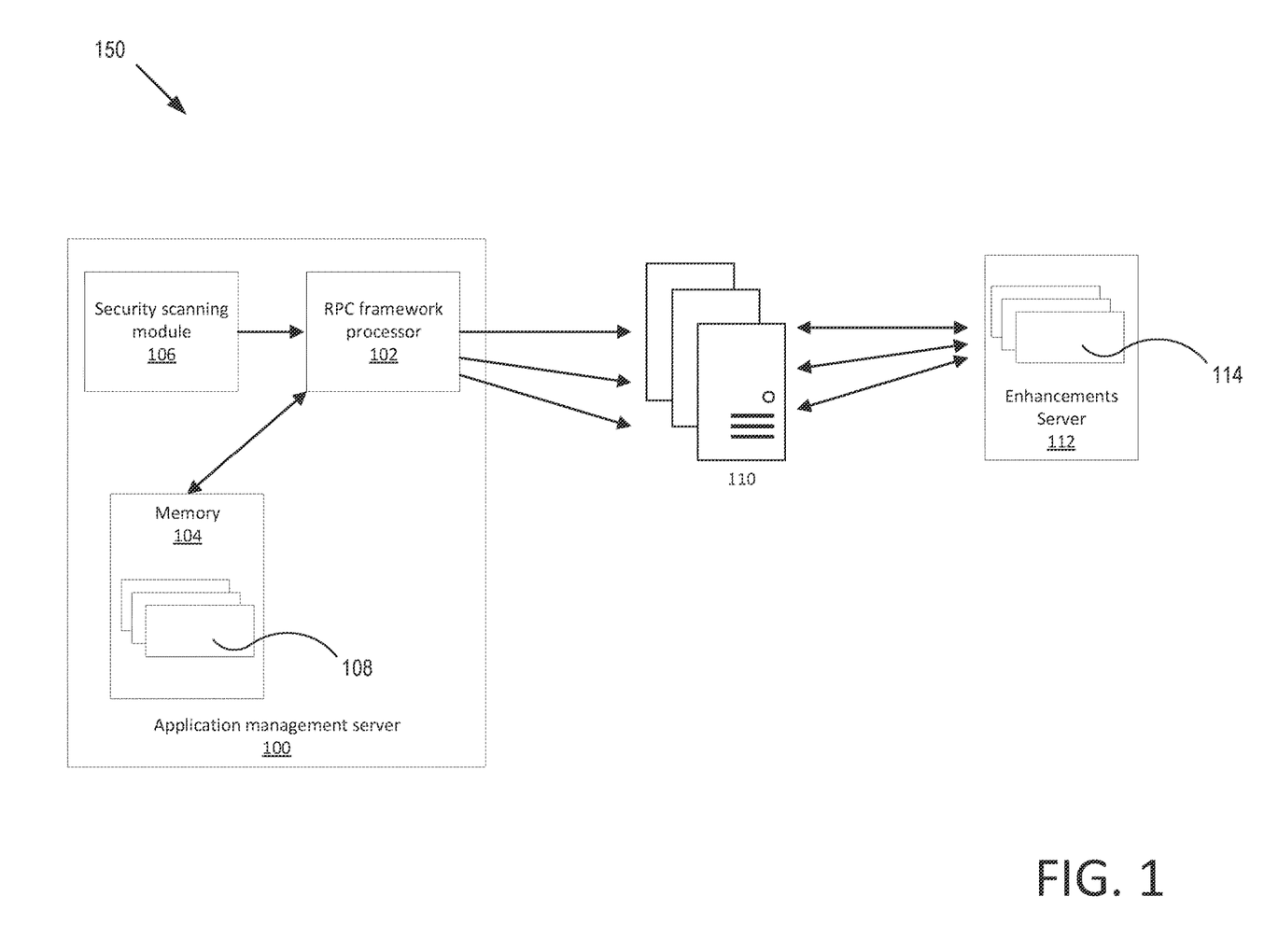
FIG. 1 depicts a system including an application management server, a set of associated remote computing engines, and an enhancements server.

FIG. 1 shows an example system 150 including an application management server 100, which includes an RPC framework processor 102, a memory 104, and a security scanning module 106. The memory 104 stores a set of queues 108.

Application management server 100 is communicatively coupled to a plurality of engines 110. Engines 110 in an RPC framework can be arranged at various local or network-connected locations for distributed workflow. Engines 110 can be brought online or disconnected during the normal operation of system 150. While only three engines 110 are shown in FIG. 1, it should be understood that this simplified schematic is limited for clarity of depiction and that in practice there may be a large number of engines 110 or other networked devices. In a typical RPC framework, application management server 100 may be coupled to thousands or tens of thousands of engines like those shown in FIG. 1 as engines 110.

Application management server 100 carries out the core functions of an RPC framework. For example, RPC framework processor communicates to each of the engines 110 based on information stored in the memory 104. Application management server 100 may also include a security scanning module 106 that analyzes data and processes carried out by the RPC framework processor 102.

Memory 104 maintains a set of tasks to be completed by the application management server 100. In one embodiment, memory 104 can stores such tasks in a self-balancing tree construct, as described in the application entitled "Resource Balancing for Workload Management in Networked Systems," application Ser. No. 18/319,937, filed on the same day as the instant application, the contents of which are incorporated by reference herein in their entirety. Memory 104 receives new tasks, clears completed tasks, and reallocates tasks from engines 110 that have a larger number of tasks to complete to other engines 110 that have relatively fewer tasks to complete. Memory 104 can be contained in volatile or non-volatile memory or a combination thereof. Memory 104 updates the workload assignments of engines 110 and their corresponding queues 108 using allocated resources.

Engines 110, as mentioned briefly previously, are a set of distributed workload handlers, such as servers or local processors. Engines 110 can be CPU-bound workload handlers, input/output (I/O)-bound handlers, memory-bound workload handlers, network-bound workload handlers, or some combination thereof. Engines 110 can go online or offline as resources are allocated, deallocated, or experience failures or go back online, such that there may be some change in the engines 110 that are available and in communication with RPC framework processor 102 at any given time.

Enhancements server 112 is accessible to each of the engines 110 that is online at any given time. Enhancements server 112 can include a database of code or instructions for engines 110 to access to carry out individual enhancements 114. Enhancements server 112 can send a list of assigned individual enhancements corresponding to one or more files to the various engines 110 in the RPC framework based on queues 108.

Individual enhancements 114 can be, for example, code that is usable for recognition of a particular type of file, or code that is usable for recognition of contents of a file. Individual enhancements 114 can also be used for file modification or for modification of the contents of a file. Individual enhancements 114 can also include code that is used to modify a particular program or process.

In some instances, an enhancement may be pinned to a particular engine 110. For example, where an individual enhancement 114 is used on file types that are sent to a pinned engine 110, the enhancement 114 usable on that file type can also be pinned to the engine 110. This may be useful in circumstances where, for example, an individual enhancement 114 accesses secure or sensitive data, and both the pinned engine 110 and the pinned enhancement 114 can be properly secured to address those security or sensitivity concerns.

Figure 2:
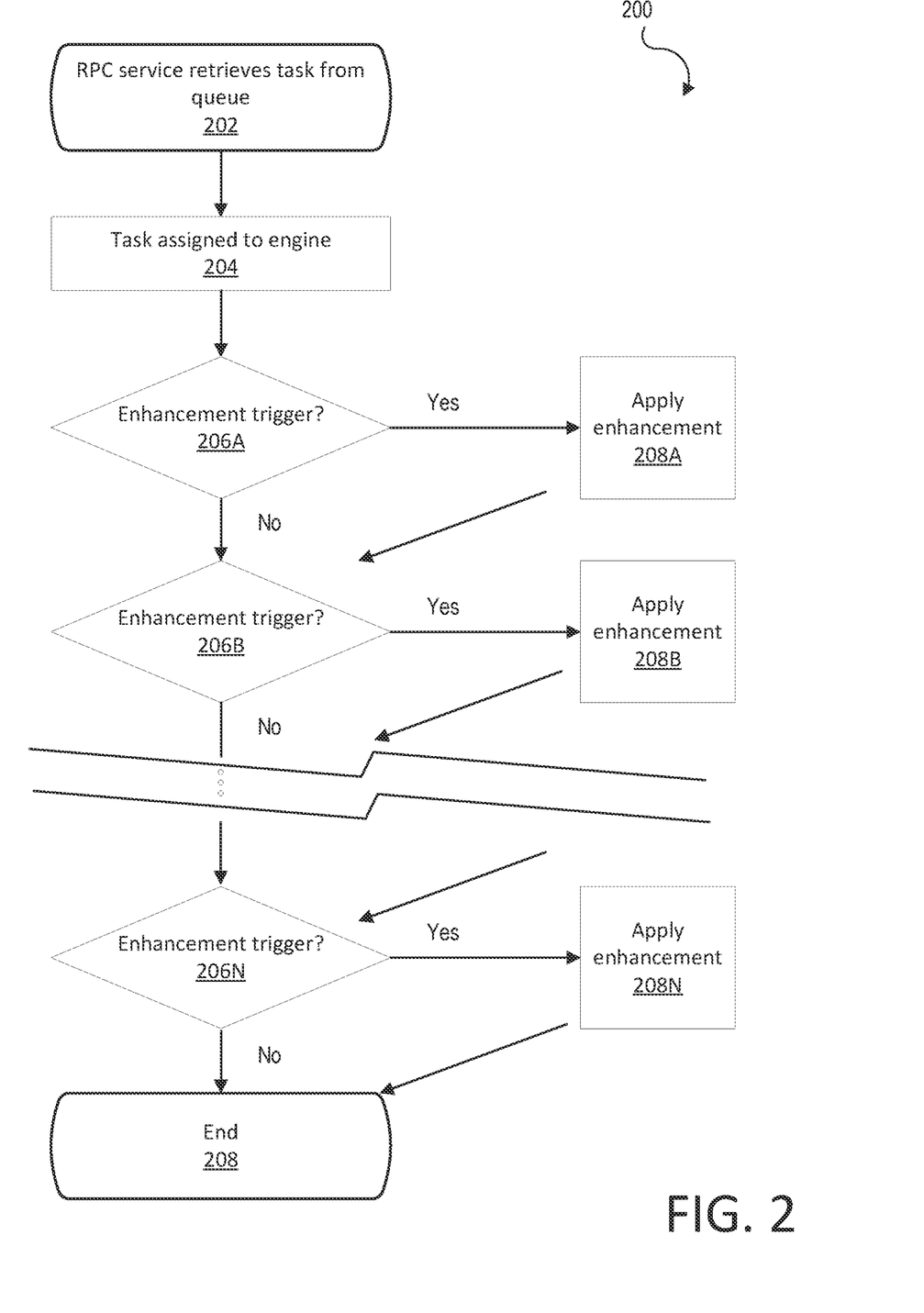
FIG. 2 is a method for performing data enhancements by the enhancements server of FIG. 1.

FIG. 2 shows a method 200 for carrying out enhancements using an engine 110 of FIG. 1. The method 200 starts with assignment of a task to an engine at 204. As shown in FIG. 1, tasks can be assigned to an engine 110 by RPC framework processor 102 corresponding to a queue 108 stored in memory 104.

Returning to FIG. 2, a check is performed for a first enhancement trigger at 206A. If the enhancement trigger is identified, then an enhancement is applied at 208A. This process can be repeated for an arbitrary number of enhancement triggers (206A, 206B, . . . 206N).

The number of enhancement triggers 206A-206 that are checked can be based upon a type of engine (FIG. 1, 110). For example, engines 110 that process one specific type of file may be assigned queues 108 that instruct those engines 110 to apply a subset of the individual enhancements 114 corresponding to that file type. Other engines 110 that process different specific types of files may be assigned queues 108 that instruct those engines 110 to apply a partially or completely different set of individual enhancements 114.

Some engines 110 are generic work handlers and are not pinned or assigned specific types of files. For such engines 110, queues 108 can be assigned that cause the engines 110 to check for a wide variety of enhancement triggers 206A-206N. Queues 108 can include instructions to check any all of the enhancements 114 stored at enhancements server 112 or any subset thereof.

In some methods 200, checking for an enhancement trigger 206A-206N can be performed by the engine 110 that is assigned a task at 204. In other methods 200, checking for an enhancement trigger 206A-206N can be performed by the enhancements server 112. It will generally be more resource-efficient for engines 110 to carry out the enhancements 114 stored in enhancements server 112, to prevent the enhancements server 112 from becoming a bottleneck on the overall RPC system. However, in some instances there may be proprietary or sensitive enhancements 114, or enhancements 114 that for some other reason are kept on enhancements server 112 rather than being exposed to engines 110.

Similarly, applying enhancements 208A-208N where the corresponding enhancement trigger 206A-206N has been detected is often carried out by the engine 110 that is assigned a task at 204. However, in some circumstances application of the enhancement at 208A-208N can be carried out by the enhancements server 112.

In FIG. 2, checking for enhancement triggers at 206A-206N is conducted for each enhancement in series. It should be understood that in some embodiments, method 200 could include checking for enhancements in parallel, either at enhancements server 112 or at engine 110. Some RPC systems can include multiple enhancements servers 112 each of which correspond to a different group of enhancements 114 and which can operate in parallel with one another.

The following drawings illustrate specific examples of enhancements 114 that can be carried out in accordance with the method of FIG. 2.

Figure 3:
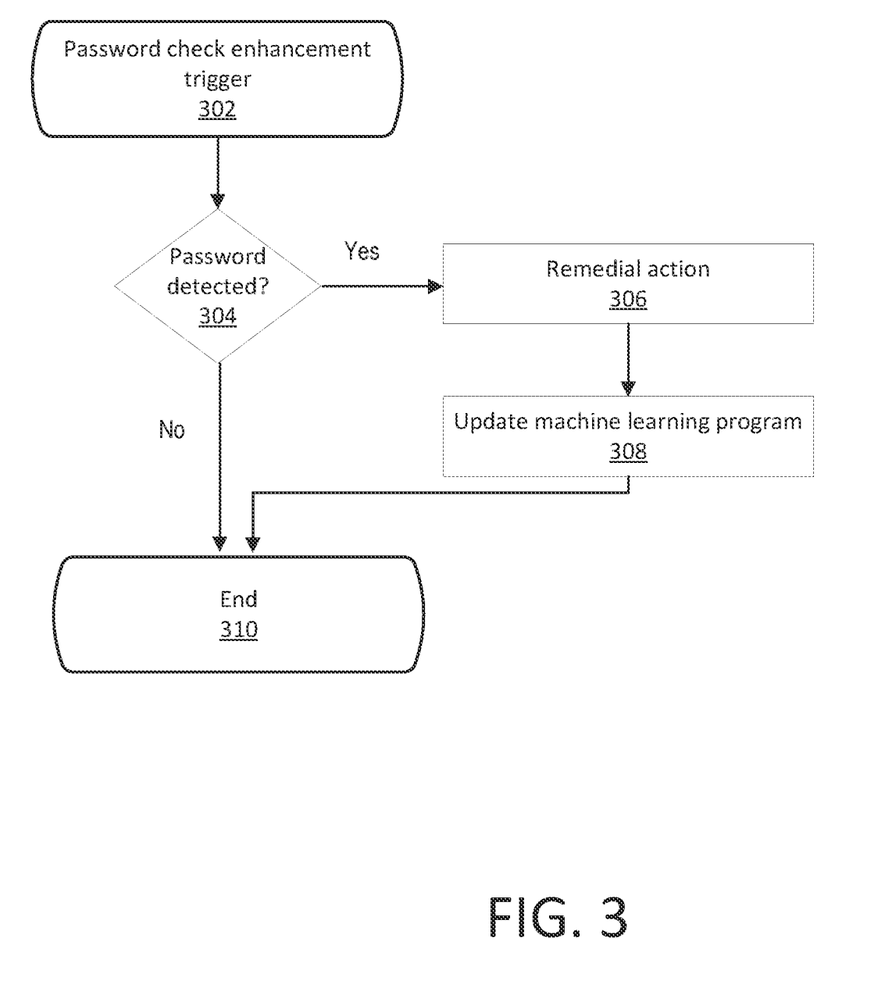
FIG. 3 is a method for weak password detection applied as a data enhancement, as a part of the method of FIG. 2.

FIG. 3 shows a first example of an enhancement that can be carried out as a part of method 200. Specifically, FIG. 3 shows a method for detecting weak passwords.

At 302, there is a password check enhancement trigger. Password check enhancement trigger 302 could be, for example, implemented as enhancement trigger 206A of FIG. 2, or at some other enhancement trigger (206A-206N) in method 200.

Password check enhancement trigger 302 can be a trigger that is initiated by any of a number of factors. In the simplest case, referring to FIG. 1, all files that are sent by RPC framework processor 102 to engines 110 have instructions from a queue 108 that requires the file be checked for passwords using a password checking enhancement 114 at the enhancements server 112. Alternatively, only certain types of files or data may include a trigger to be checked for passwords using a password checking enhancement 114 at the enhancements server 112.

Returning to FIG. 3, a file for which a password check enhancement is triggered at 302 may be examined for a password at 304. Detection of a password at 304 can be carried out using a machine learning neural network designed to detect low entropy passwords or low-entropy password strings, for example. If no password or low-entropy password string is detected at 304, this can be an indication that either the file contains no password or that any passwords within the file are sufficiently complex or encrypted that they are not detected.

The machine learning neural network described above can be trained using data from a password generator that generates passwords that are alike to common or weak passwords or portions thereof. For example, the machine learning neural network can be trained using birthdays, names, or commonly-used strings of characters or numbers.

Upon detecting passwords (or portions thereof) at 304, a remedial action can be taken at 306. The remedial action could include requiring a password be updated or strengthened. Alternatively, a file containing a password or portion thereof that is detected could be encrypted.

At 308, a machine learning program is optionally updated. When a password has been detected, this can be fed back to the neural net or other algorithm or algorithms used to detect passwords. This can provide further improvement to the algorithm to better detect other passwords when the enhancement is used subsequently. In this way the data can be used to train a neural network to effectively identify weak passwords.

At 310, either when no password is detected at 304 or when remedial action has been taken at 306, the enhancement program is completed.

Figure 4:
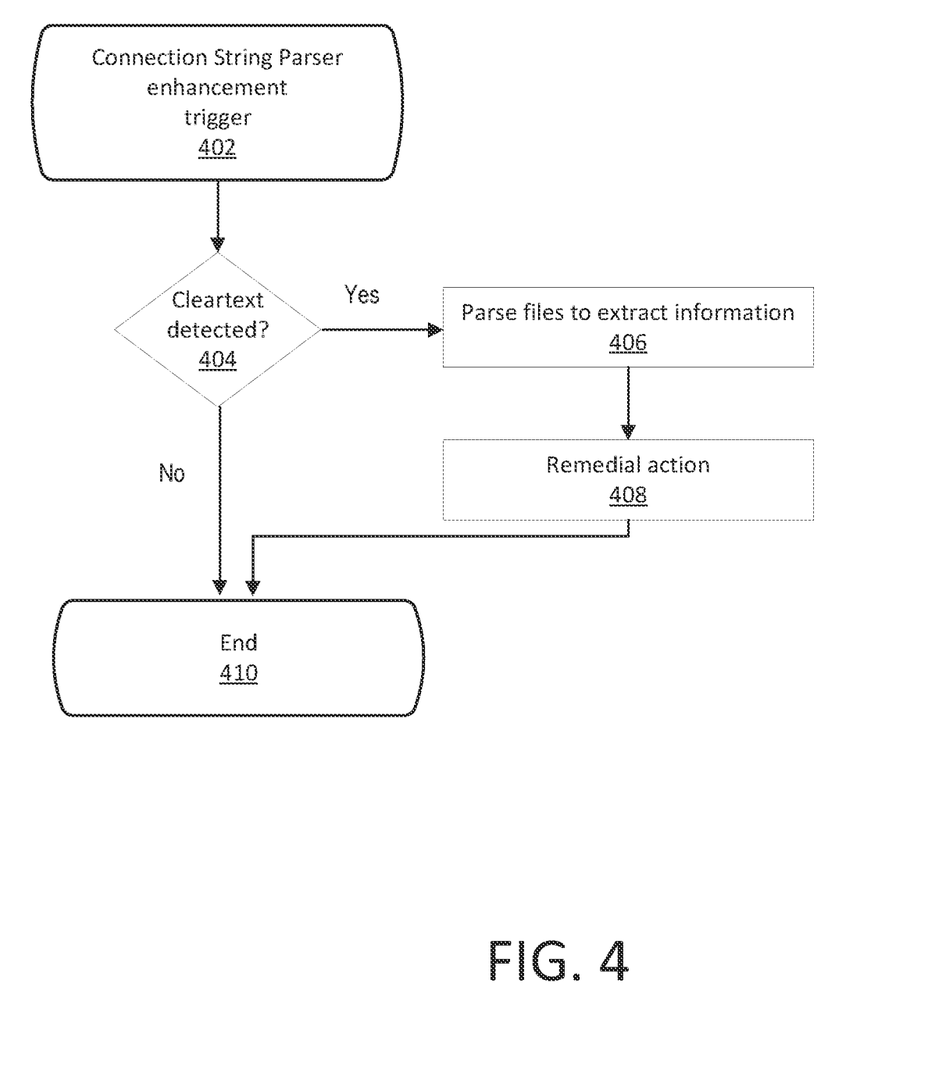
FIG. 4 is a method for connection string parsing applied as a data enhancement, as a part of the method of FIG. 2.

FIG. 4 shows another example of an enhancement that can be carried out in accordance with the method of FIG. 2. The enhancement in FIG. 4 is a string parser.

At 402, the cleartext string parser enhancement is triggered. As described with respect to FIGS. 1-3, this can be done for all files handled by RPC framework processor 102, or only for some engines 110, or in some subset of queues 108.

At 404, cleartext may be detected. Cleartext is data that is unencrypted or for which meaning is otherwise recognizable by a computer. Cleartext could include credential material, server information, database information, or passwords, for example. Depending upon the type of cleartext that is identified, further action may be advisable to prevent inadvertent disclosure of sensitive or private information.

Detection of cleartext at 404 can be conducted by a neural network as described with respect to password detection in FIG. 3. In other examples, cleartext can include a simple search for common words, phrases, or numbers.

At 406, if cleartext has been detected, the file or files containing such cleartext can be parsed to extract the information present in cleartext format.

Based upon the information extracted at 406, remedial action can optionally be taken at 408. Remedial action at 408 can include encrypting the file or files containing cleartext, or stopping engine 110 from processing or sharing the file, or sending information to the RPC processor 402 to alert a user that unencrypted information has been detected in the file.

At 410, either when no cleartext is detected at 404 or when remedial action has been taken at 408, the enhancement program is completed.

Figure 5:
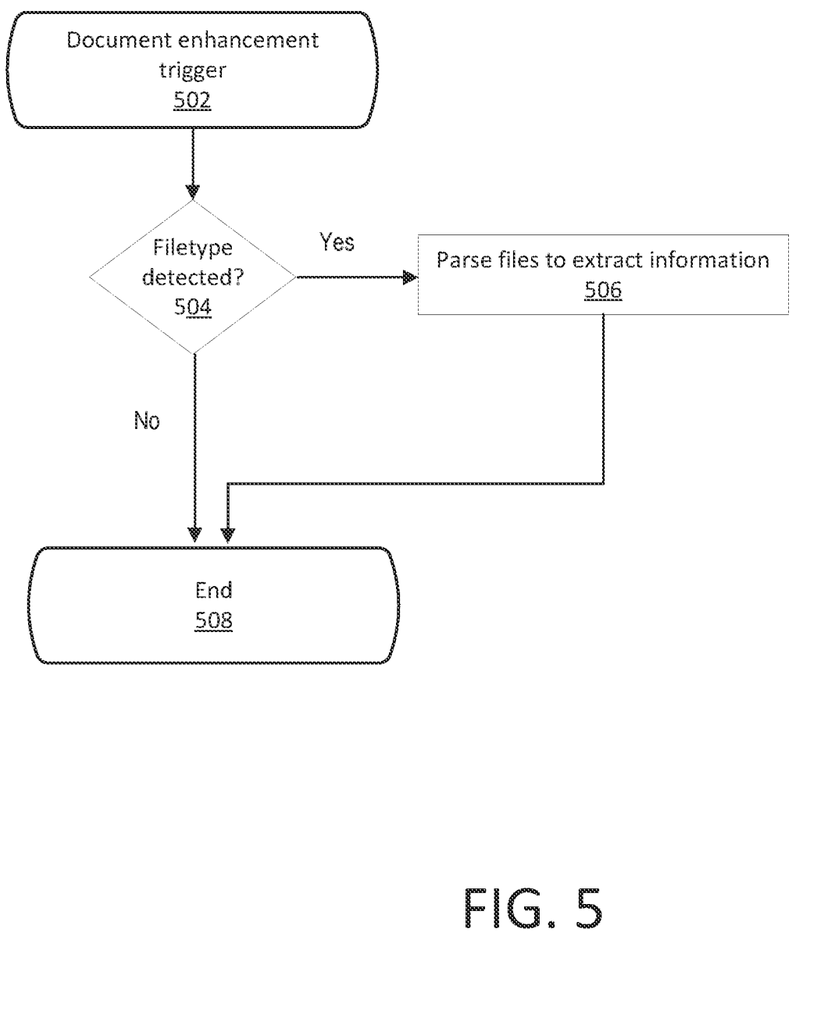
FIG. 5 is a method for document detection and parsing applied as a data enhancement, as a part of the method of FIG. 2.

FIG. 5 shows another example of an enhancement that can be carried out in accordance with the method of FIG. 2. The enhancement in FIG. 5 is a document enhancer.

At 502, the document enhancer enhancement is triggered. As described with respect to FIGS. 1-4, this can be done for all files handled by RPC framework processor 102, or only for some engines 110, or in some subset of queues 108.

At 504, certain file types may be detected. For example, file types that should include recognizable text, such as text documents, spreadsheets, or PDFs can be detected. Additionally or alternatively, file types that could contain malicious software or executable code can be detected.

Some files contain information that could be useful to the functioning of the overall RPC network, such as knowledge of the text content of a PDF file, but that content may not always be readily available. In the context of a PDF document, it may be necessary to conduct optical character recognition on the contents of the file to obtain the contents thereof. Similar modifications or additions may be necessary to make better use of the contents of other types of files as well.

At 506, if a file type has been detected that could contain such additional content, the file or files containing such content can be enhanced to obtain that information. Obtaining that information at 506 can include extracting text from binary and structured text documents.

At 508, either when no relevant file type is detected at 504 or when remedial action has been taken at 506, the enhancement program is completed.

Figure 6:
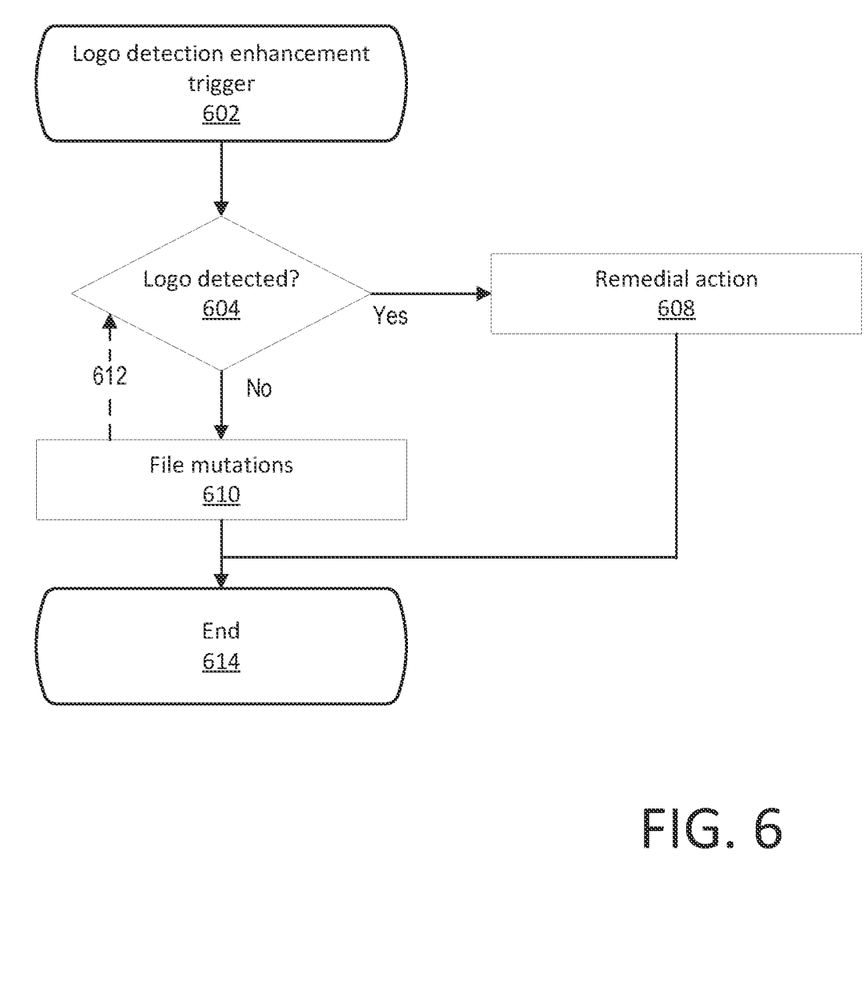
FIG. 6 is a method for logo detection applied as a data enhancement, as a part of the method of FIG. 2.

FIG. 6 shows another example of an enhancement that can be carried in accordance with the method 200 of FIG. 2.

At 602, the logo detection enhancement is triggered. As described with respect to FIGS. 1-5, this can be done for all files handled by RPC framework processor 102, or only for some engines 110, or in some subset of queues 108.

At 604, a logo may be detected. Logos can be, for example, a corporate logo or trademark. However, logos that are detected at 604 can include other graphical symbols, for example a stamp or confidential-material label. Logo detection can also be completed using a neural network that can identify a logo in all its forms (both modern and historical) including modifications, distortions, and corruptions.

Often an organization uses a standard labeling system to mark documents that are for internal use or confidential. If such a label—or any previously-used label—is identified in a file, then it may indicate that the file should not be distributed throughout an RPC network. As such, when a logo is detected at 604, a remedial action can be taken at 608. The remedial action can be stopping processing of the file or creating an alert, for example.

Logos can be arranged in any orientation, resolution level, or level of image quality. Therefore even when a logo is not detected at 604 the method of FIG. 6 optionally includes manipulating the file at 610 and returning the file 612 for another attempt at logo detection at 604. File mutation 610 can include flipping, rotating, or mutating the image or a metadata file associated with the original image. It should be understood that while reference is made to logos at 604, and manner of pictorial information could be identified using such a system. For example, pictorial information can include "Confidential" stamps, or copyright logos, or other pictorial information that may indicate that sharing or distribution of the file may not be appropriate.

When file mutations 610 are complete, the enhancement method of FIG. 6 ends at 614.

Figure 7:
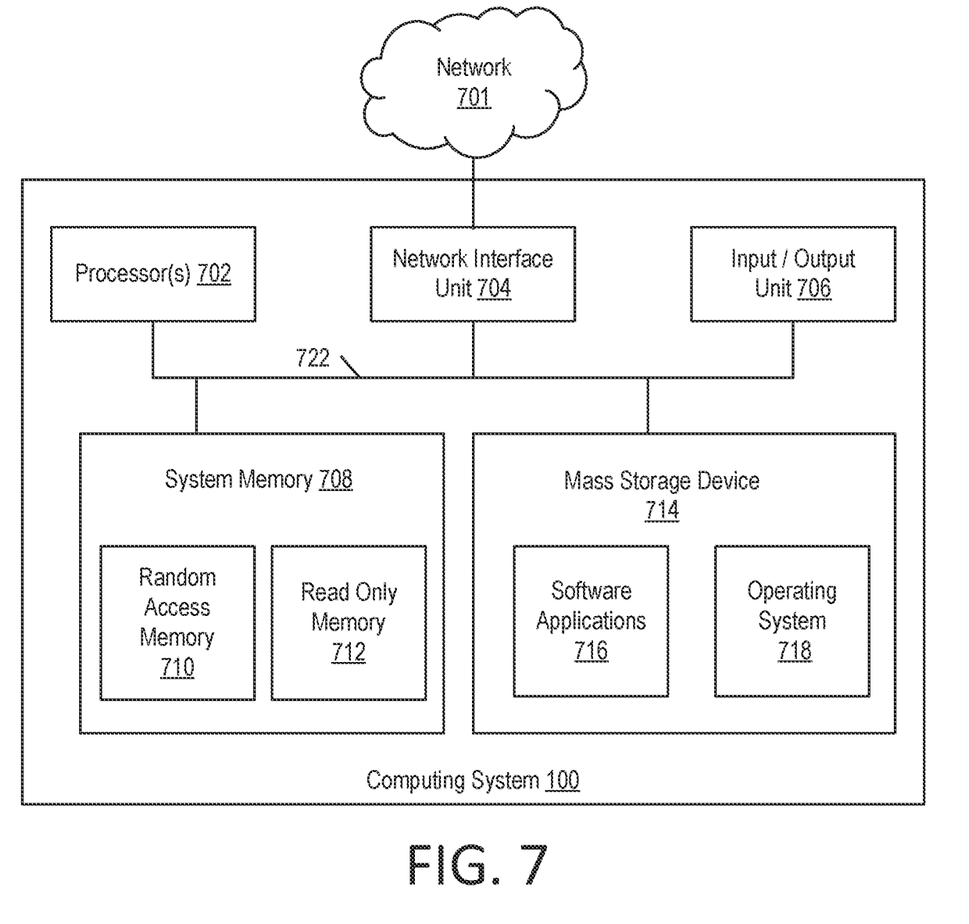
FIG. 7 illustrates an example computing system with which aspects of the present disclosure may be implemented.

FIG. 7 illustrates an example block diagram illustrating the various components of the application management server 100 of FIG. 1. The remaining computing devices described herein can be similarly configured.

In the embodiment shown, the application management server 100 includes one or more processors 702, a system memory 708, and a system bus 722 that couples the system memory 708 to the one or more processors 702. The system memory 708 includes RAM (Random Access Memory) 710 and ROM (Read-Only Memory) 712. A basic input/output system that contains the basic routines that help to transfer information between elements within the application management server 100, such as during startup, is stored in the ROM 712. The application management server 100 further includes a mass storage device 714, corresponding to the non-volatile memory as described elsewhere in the application. The mass storage device 714 is able to store software instructions and data. The one or more processors 702 can be one or more central processing units or other processors.

The mass storage device 714 is connected to the one or more processors 702 through a mass storage controller (not shown) connected to the system bus 722. The mass storage device 714 and its associated computer-readable data storage media provide non-volatile, non-transitory storage for the application management server 100. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the application management server 100.

According to various embodiments of the invention, the application management server 100 may operate in a networked environment using logical connections to remote network devices through the network 701. The network 701 is a computer network, such as an enterprise intranet and/or the Internet. The network 701 can include a LAN, a Wide Area Network (WAN), the Internet, wireless transmission mediums, wired transmission mediums, other networks, and combinations thereof. The application management server 100 may connect to the network 701 through a network interface unit 704 connected to the system bus 722. It should be appreciated that the network interface unit 704 may also be utilized to connect to other types of networks and remote computing systems. The application management server 100 also includes an input/output controller 706 for receiving and processing input from a number of other devices, including a touch user interface display screen, or another type of input device. Similarly, the input/output controller 706 may provide output to a touch user interface display screen or other type of output device.

As mentioned briefly above, the mass storage device 714 and the RAM 710 of the application management server 100 can store software instructions and data. The software instructions include an operating system 718 suitable for controlling the operation of the application management server 100. The mass storage device 714 and/or the RAM 710 also store software instructions, that when executed by the one or more processors 702, cause one or more of the systems, devices, or components described herein to provide functionality described herein. For example, the mass storage device 714 and/or the RAM 710 can store software instructions that, when executed by the one or more processors 702, cause the application management server 100 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An application management system comprising:
  an enhancements server configured to store a plurality of individual enhancements for remote procedure calls;
  a plurality of distributed engines communicatively coupled to the enhancements server;
  an application management server comprising:
  a memory and configured to store a plurality of queues corresponding to a plurality of tasks; and
  a processor communicatively coupled to the plurality of engines, the processor configured to assign the plurality of tasks to the plurality of engines based upon the plurality of queues;
  wherein the plurality of queues includes instructions to cause the plurality of engines to apply the plurality of individual enhancements stored at the enhancements server.

2. The application management system of claim 1, wherein each of the plurality of queues includes instructions to cause an associated engine selected from the plurality of engines to apply a subset of the plurality of individual enhancements.

3. The application management system of claim 1, wherein one of the plurality of individual enhancements is a password detection enhancement configured to detect low-entropy password strings.

4. The application management system of claim 3, wherein the password detection enhancement comprises a neural network trained on a set of known weak passwords.

5. The application management system of claim 1, wherein one of the plurality of individual enhancements is a logo detection enhancement configured to detect pictorial information.

6. The application management system of claim 5, wherein the logo detection enhancement comprises a neural network trained on a set of pictorial information.

7. The application management system of claim 1, wherein the plurality of queues each include a list of assigned individual enhancements corresponding to an engine of the plurality of engines.

8. A method comprising:
  storing a queue in a memory of an application management server, the queue including a plurality of tasks to be performed by an engine;
  assigning the queue to a distributed engine by a remote procedure call processor of the application management server;
  for the plurality of tasks, identifying one or more enhancement triggers by the engine; and
  obtaining and applying an enhancement for remote procedure calls corresponding to the one or more enhancement triggers, wherein the enhancements are stored on an enhancements server communicatively connected to the distributed engine.

9. The method of claim 8, wherein applying the enhancement corresponding to each of the one or more enhancement triggers is carried out by the engine.

10. The method of claim 8, wherein applying the enhancement corresponding to each of the one or more enhancement triggers is carried out by an enhancements server.

11. The method of claim 8, wherein the one or more enhancement triggers comprises a plurality of enhancement triggers carried out sequentially.

12. The method of claim 8, wherein the one or more enhancement triggers includes a password check enhancement configured to detect a low-entropy password.

13. The method of claim 12, wherein the password check enhancement comprises a neural network.

14. The method of claim 8, wherein the one or more enhancement triggers includes a connection string parser enhancement configured to detect cleartext.

15. The method of claim 14, wherein the connection string parser enhancement comprises a neural network.

16. The method of claim 8, wherein the one or more enhancement triggers includes a logo detection enhancement configured to detect a logo.

17. The method of claim 16, wherein the logo detection enhancement is configured to:
  manipulate a file by flipping, rotating, or mutating the file; and
  detect pictorial information in the file before and after the manipulating of the file.

18. A method comprising:
  retrieving, by an engine, a queue of tasks corresponding to a file;
  identifying, by a machine learning model at the engine, one or more enhancement triggers corresponding to the file in the queue of tasks;
  applying an enhancement for remote procedure calls corresponding to each of the one or more enhancement triggers, wherein the enhancement is stored on an enhancements server remote from the engine; and
  using an identification of the one or more enhancement triggers as feedback to the machine learning model.

19. The method of claim 18, wherein the one or more enhancement triggers comprise a logo detection enhancement trigger, and wherein the machine learning model is a logo detection enhancement configured to:
  manipulate the file by flipping, rotating, or mutating the file; and
  detect pictorial information in the file before and after the manipulating of the file.

20. The method of claim 18, wherein the one or more enhancement triggers comprise a password detection enhancement trigger, and wherein the machine learning model is a password detection enhancement configured to identify a low-entry password in the file using a neural network.

* * * * *